United States Patent [19]

Venable, Jr.

[11] 3,958,946

[45] May 25, 1976

[54] CARBON BLACK REACTOR

[75] Inventor: Charles R. Venable, Jr., Bartlesville, Okla.

[73] Assignee: Phillips Petroleum Company, Bartlesville, Okla.

[22] Filed: Mar. 6, 1975

[21] Appl. No.: 556,124

[52] U.S. Cl. .............................. 23/259.5; 264/30; 23/277 R
[51] Int. Cl.² ...................... F27D 1/16; C01B 49/00
[58] Field of Search ..................... 23/259.5; 264/30

[56] References Cited
UNITED STATES PATENTS 2,877,717   3/1959   Reed ............................... 23/259.5
3,560,164   2/1971   Venable, Jr. ........................ 23/259.5
3,736,102   5/1973   Rogers, Jr. et al. ................. 23/259.5

OTHER PUBLICATIONS

McDowell, Sprung–Arch Roofs for High Temp. Furnaces, Feb. 1940, Blast Furnace & Steel Plant Part III, Reprint, pp. 1–11.
McDowell et al., Refractory Arches, Apr. & May 1938, "Steel."

Primary Examiner—James H. Tayman, Jr.

[57]   ABSTRACT

A carbon black reactor employing a dished head at its feed inlet, this head comprising a sprung arch dome and an interpositioned layer of insulation.

5 Claims, 5 Drawing Figures

CARBON BLACK REACTOR

This invention relates to carbon black reactors. In one aspect, this invention relates to vertically positioned carbon black reactors for the production of soft blacks.

In the operation of vertical carbon black reactors, it has been observed that the least durable reactor component has been the refractory lining and anchorage system for the top closure. Special anchors made of refractory materials, such as fireclay or high alumina materials, have not been completely satisfactory as anchorages for multicourse castable refractory linings. Such anchors have tended to fracture at, or near, the interface of refractory courses as a result of shearing stresses resulting from the differential thermal expansion of the various courses.

It is an object of this invention to provide a vertical carbon black reactor having an improved closure head.

Other aspects, objects and advantages of the present invention will be apparent to one skilled in the art from study of the following disclosure, claims and appended drawings of which FIG. 1 is an elevational view of the carbon black reactor concerned;

According to the present invention, there is provided a carbon black reactor which comprises an insulated chamber closed by a first closure at a first end of the chamber and a second closure at a second end of the chamber. The first closure is adapted with reactant inlet means in communication with the chamber and the second closure is adapted with product outlet means in communication with the chamber. The first closure has a concave inner surface and is insulated by a sprung arch dome structure with a layer of insulation intermediate the domed structure and the first closure.

The carbon black reactor of this invention is composed of a series of zones, in axial contiguous alignment, these zones being designated as the feed introduction zone, a reaction zone, a quench zone and an outlet zone, these zones being enclosed by refractory walls, the reactor being adapted with reactant inlet means and product recovery means. The refractory walls are preferably constructed of a plurality of courses with at least two inner courses of the reaction zone, quench zone and outlet zone being formed of castable insulation and at least two inner courses of the feed introduction zone being formed of refractory shapes. The reactor is closed at its upper, or reactant inlet, end by a head of outwardly concave configuration which is adapted with a sprung arch dome construction formed of refractory shapes and with insulation positioned between the dome and the concave inner surface of the head. The problem of deterioration of the insulation of prior dished head construction is overcome by the use of the sprung arch dome construction of the present invention.

Figure 1:
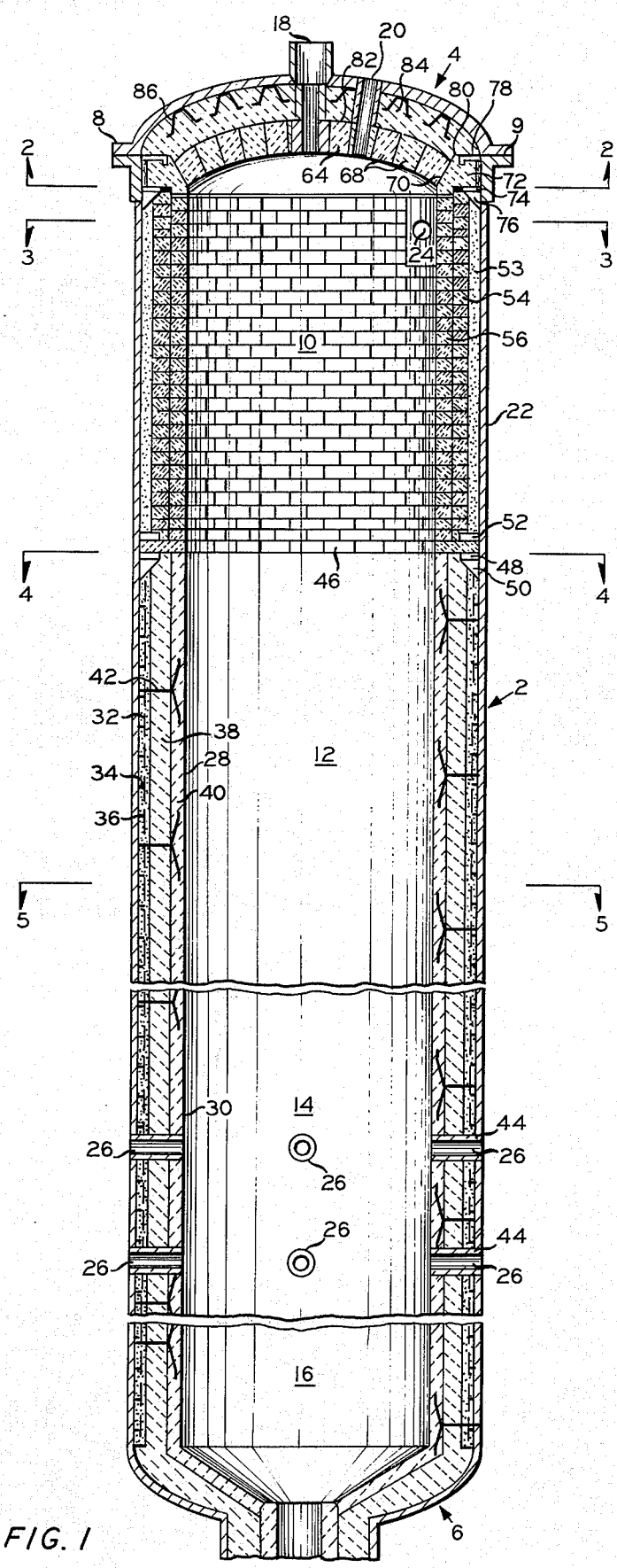

Referring now to FIG. 1, there is shown a carbon black reactor having an outer shell 2 closed at its upper end and, optionally, at its lower end by dished heads 4 and 6. That head at the outlet end of the reactor is preferably welded to the vertical walls of the vessel while that at the upper end of the reactor is preferably flanged by means of matching flanges 8. The reactor comprises, in axial contiguity, a feed introduction zone 10, a reaction zone 12, a quench zone 14 and an outlet zone 16.

Feed introduction zone 10 is terminated at its upper end with head 4 adapted with burner or feed oil introduction port 18 and sight glass opening 20. Wall 22 of zone 10 is adapted with inlet ports 24 for the introduction of combustion gases.

Quench zone 14 is adapted with a plurality of inlet ports 26, positioned at any suitable level to introduce quench medium into the zone.

The reactor is insulated throughout its feed introduction zone 10, reaction zone 12, quench zone 14 and outlet zone 16 by multicourse refractory layers of either shapes or castables, or a combination thereof.

Figure 5:
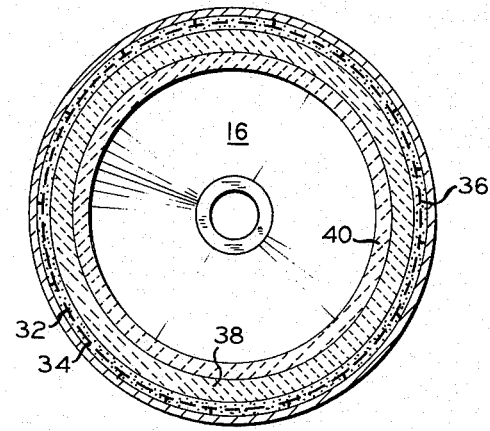
FIG. 5 is a sectional view through section 5—5 of FIG. 1.

The wall 28 of zone 12 and wall 30 of zone 14 are composed of suitable refractory in three courses. The outer course 32 adjacent the outer shell extends from zone 12 to about the knuckle radius of the lower head 6 and is suitable for temperatures of about 1900°F. Course 32 is a castable refractory such as "Insulag", available from Quigley Company, Old Bridge, N.J. It is retained at the inside of shell 2 by means of welded studs 34 and by hex netting 36 positioned between the studs as shown in FIGS. 1 and 5.

Adjacent to course 32 in walls 28 and 30 is a castable insulation 38 such as "Kast-O-Lite 30", available from A. P. Green Refractories Co., Mexico, Mo., suitable for maximum operating temperatures of about 2800°F. The inner course 40 is a castable insulation such as "Mizzou Castable", available from A. P. Green Refractories Co., Mexico, Mo., suitable for operations up to about 3200°F. Supports between the outer and inner courses are provided by means of refractory anchors 42 which are welded at their one end to the internal wall of the steel shell 2 and positioned in staggered arrangement as shown in FIG. 1. The refractory anchors 42, which maintain courses 38 and 40 in position, are suitable for about 3100°F operation. The courses 38 and 40 extend to the outlet zone 16.

Providing access as quench inlet ports 26 to zone 14 are ceramic tubes 44 such as "Mullfrax H" available from The Carborundum Co., Niagara Falls, N.Y., which penetrate through the walls of the reactor and which have a permissible operating temperature of about 3250°F.

The construction of zone 10 differs appreciably from that of zones 12 and 14.

Figure 4:
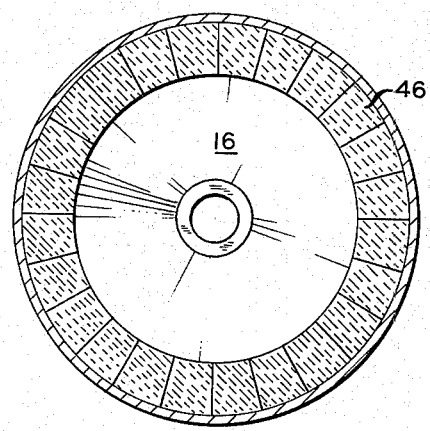
FIG. 4 is a sectional view through section 4—4 of FIG. 1.

Separating zone 10 from zone 12 is a layer of keyed brick 46 such as "Hotspan" key brick available from A. P. Green Refractories Co., Mexico, Mo., disposed with their longitudinal axes perpendicular to the longitudinal axis of the reactor as shown in FIG. 4. These brick have an operating temperature of about 3200°F and are cut to a length equal to the thickness of the superimposed wall 22 of zone 10 and lower wall 28 of zone 12.

The brick 46 are supported on wall 28 of zone 12 by means of support ring 48 positioned on gusset plate 50, with angle ring 52 being positioned above the brick 46 to facilitate their retention. The wall 22 of zone 10 is supported by brick 46. Wall 22 consists of an outer course 53 of 1900°F insulation such as Insulag, an intermediate course 54 of 2800°F insulating fire brick such as "G-28" available from A. P. Green Refractories Co., Mexico, Mo., and an inner course 56 of 3200°F fire brick such as "Mullfrax W". The intermediate couse 54 and inner course 56 are preferably of approximately equal thickness.

Figure 3:
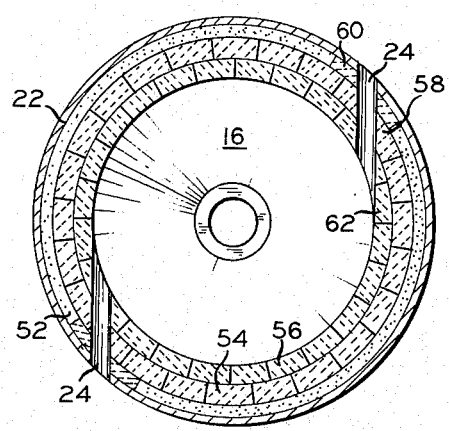
FIG. 3 is a sectional view through section 3—3 of FIG. 1.

Port 24 through wall 22 is formed by pouring intermediate wall castable insulation 58 around a conduit form penetrating the wall and subsequently removing the form. The resulting entrance port is illustrated in FIG. 3. The outer shape 60 proximate port 24 is 1900°F block insulation and the inner shape 62 is precast having an operating temperature of 3200°F, the intermediate wall 58 being formed of a 2800°F castable insulation.

Figure 2:
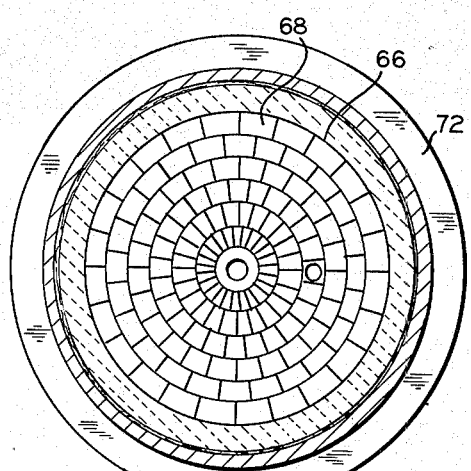
FIG. 2 is a sectional view through section 2—2 of FIG. 1.

The closure section of zone 10 is comprised of a self-supporting brickwork sprung arch 64 having a generally dome-shaped configuration. Arch 64, as shown in FIG. 2, comprises a plurality of annular rows 66 of bricks 68 having an operating temperature of about 3200°F such as Mullfrax W, which rows 66 decrease in diameter as the center of the closure section is approached. Bricks 68 are tapered in horizontal cross-section so that the annular rows 66 can be formed without substantial gaps being presented between the bricks. The shape of the respective brick of each ring are dictated by conventional practice.

Arch 64 is self-supporting and is positioned in the closure section of zone 10 by resting the outer edge thereof on the inclined leg 70 of skewback 72. The skewback 72 is a layer of specially shaped keyed brick such as Mullfrax W, disposed as shown in FIG. 2. These brick have an operating temperature of about 3200°F and are prepared to a length equal to the thickness of superimposed wall 22 of zone 10. They are supported on wall 22 by means of support ring 74 positioned on gusset plates 76 with anchors 78 to facilitate retention of the skewback. The upper surface 80 of skewback 72 extends up to the level of the mating surface 9 of the mating flanges 8.

Intermediate the upper domed surface 82 of arch 64 and head 4 is a layer of castable refractory 84 such as Kast-O-Lite 30, suitable for operations up to about 2600°F. It is optionally suspended from the head 4 by stainless steel anchors 86 which are welded at their one end to the inside of head 4.

The construction of the closure section of zone 10 allows the vertical brickwork of courses 54 and 56 to expand without stressing the skewback 72 and the dome 64. Further, the arched dome construction of the closure section is more durable than castable refractory materials which shrink at operating temperatures.

In fabrication of the closure section, a dome-shaped wooden form or the like is located within the reactor and the concentric rings are built up, after which the building form is removed. The top head is installed and the castable refractory is poured between the top head and the upper surface of the arch. Optionally, a parting compound can be applied to the upper domed surface 82 of the arch 64, the upper surface 80 of skewback 72 and the mating surfaces 9 of flanges 8 in order that, once the castable refractory has set, the head shell 4 and castable lining 84 can be removed from the reactor as a unit.

All materials of construction including firebrick, castable insulation, mortar, anchors and the like, are conventional in the art.

It will be appreciated that the apparatus of this invention can be modified from the description given in the foregoing. Such modifications are considered to be within the scope of this invention.

I claim:
1. A carbon black reactor comprising:
   a. an insulated chamber;
   b. a first closure at a first end of said chamber; and
   c. a second closure at a second end of said chamber; said first closure being adapted with reactant inlet means in communication with said chamber and said second closure being adapted with product outlet means in communication with said chamber, wherein said first closure has a concave inner surface, and is insulated by at least two layers of refractory comprising a first layer of self-supporting brickwork sprung arch having a generally dome-shaped configuration comprising a plurality of annular rows of bricks, said rows decreasing in diameter as the center of said dome-shaped configuration is approached, and a second layer of cast construction positioned between said first layer and said inner surface of said first closure.

2. A carbon black reactor according to claim 1 wherein said insulated chamber is formed of vertically upstanding walls.

3. A carbon black reactor according to claim 2 wherein said first layer of refractory is supported by a skewback supported by said vertically upstanding walls of said chamber.

4. A carbon black reactor according to claim 3 wherein said first closure is adapted with a plurality of openings therethrough for introduction of reactants into said chamber, at least one of said openings positioned axially through said first closure and through said first and second layers.

5. A carbon black reactor according to claim 2 wherein said insulated chamber comprises a feed introduction zone, a reaction zone, a quench zone and an outlet zone in axial contiguity, the insulation of said chamber comprising a plurality of courses, wherein at least two inner courses of said reaction zone, said quench zone and said outlet zone are formed of castable insulation and at least two inner courses of said feed introduction zone, are formed of refractory shapes.

* * * * *